Figure 1:
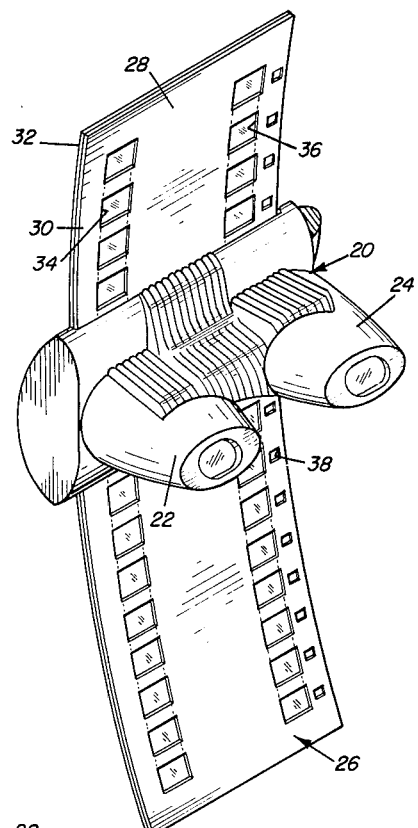

Aug. 3, 1965

R. A. HELD 3,197,888

METHOD FOR TEACHING MANUAL SKILLS

Filed Sept. 4, 1962

INVENTOR.
RICHARD A. HELD

BY
ATTORNEYS

United States Patent Office 3,197,888
Patented Aug. 3, 1965

3,197,888
METHOD FOR TEACHING MANUAL SKILLS
Richard A. Held, Rte. 1, Box 90-B3, Ramona, Calif.
Filed Sept. 4, 1962, Ser. No. 221,242
1 Claim. (Cl. 35—29)

The present invention is directed to an educational device, particularly mechanism for comparing the students' forms of action with the forms of action of an expert in a certain field.

The present invention includes a magnifying viewer similar to the standard stereoscope, in combination with an elongated strip of substantially opaque, or opaque material which is adapted to be threaded through the viewer. This strip is provided with two sets of spaced windows; both of these sets extend longitudinally of the strip; the windows of one set are aligned, at right angles from longitudinal, with the windows of the other set. A strip of motion picture film, depicting the form of an expert in a certain field, is suitably attached to the substantially opaque strip, and the pictures on the film are aligned with the windows in one of the sets of windows. A strip of motion picture film, depicting the form of a student in a certain field, is suitably attached to the opaque strip with the pictures thereon aligned with the windows in said other set. The distance between the centers of the windows of either set of windows, respectively, is equal to the distance between the centers of the pictures on the respective films.

Other features and the advantages of the present invention will be apparent from the following description, reference being had to the accompanying drawing wherein a preferred embodiment of the invention is illustrated.

Figure 2:
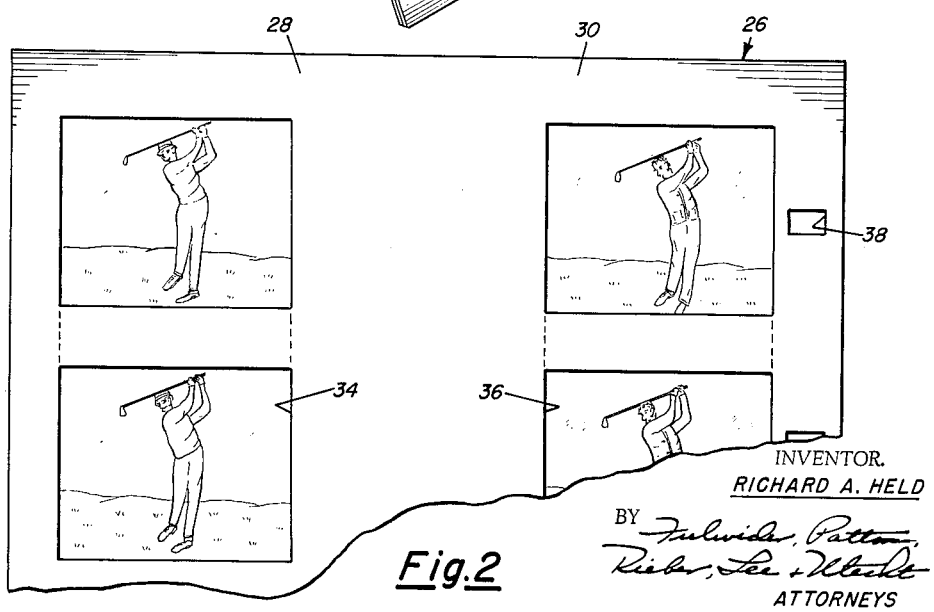

In the drawing:

FIG. 1 is a perspective view showing the assembled viewer and the opaque strip carrying the two strips of motion picture film; and FIG. 2 is a fragmentary view, on a larger scale, of the upper end of the opaque strip and motion picture films shown in FIG. 1.

Referring more in detail to the drawing, a viewer of the stereoscope type is shown at 20. Such viewer is now being manufactured and sold by Sawyer's Inc. of Portland 7, Oregon, Stock No. 5021, and sold under the trademark "True-Vue." It includes two eye pieces, one for the left eye shown at 22, and one for the right eye shown at 24. This viewer 20 magnifies the film which is threaded therethrough.

The assembly of the opaque strip and the two motion picture films is herein shown at 26. It includes an elongated substantially opaque, or opaque strip 28, for example, of two sheets of paper, the front sheet being shown at 30 and the rear sheet at 32. These two sheets of material are suitably fastened to one another, as by glue, and are provided with two sets of windows 34 and 36. These windows extend through both sheets 30 and 32. Each set of windows extends longitudinally of the strip 28. The strip 28 is also provided with a series of perforations 38, which cooperate with the standard mechanism within the viewer for advancing the strip 28 through the viewer step by step, namely, from one window to the next adjacent window, and the perforations 38 are so positioned for aligning the magnifying elements of the viewer with the windows.

Two motion picture films are interposed between the sheets 30 and 32 of the strip 28, and suitably held in fixed position. The spacing between the centers of the windows is equal to the spacing between the centers of the respective pictures on the film. The motion picture film of an expert in a certain field is placed between the sheets 30 and 32 of the strip 28. For illustrative purposes, such film is placed so that the pictures on the strip of film align with the windows in set 34. A second strip of motion picture film, for example, that of an amateur or student, is placed between the sheets 30 and 32 of the strip 28, and the frames of the pictures of the film are aligned with the windows in the set 36. These films are held stationary in any suitable manner in the strip 28.

In practicing the present invention, the student is taught to emulate the form of the expert. This can be done by showing the student a motion picture of the actions of the expert. After the student has acquired a form which nears that of the expert, a motion picture is taken of the student. A motion picture will be made of the student, the speed of the camera will be the same as the speed used in making the film of the expert. Corresponding sections of the films will then be placed, one in alignment with the window 34, and the other in alignment with the window 36. The student or trainer will, for example, view one of the frames of the motion picture with his left eye only through the eye-piece 22, and then view one of the frames through a window 36 with his right eye only, through the eyepiece 24. By advancing the strip 28 and viewing the windows step by step, the faults of the student can be readily recognized.

Thus, it is apparent from the foregoing that there has been provided a simple and inexpensive instructing mechanism for assisting students in reaching perfection in any of various fields.

While the form of embodiment herein shown and described, constitutes preferred form, it is to be understood that other forms may be adopted falling within the scope of the claim that follows.

In the claim:

The method of preparing material for teaching a student a manual skill requiring coordination in time and position of parts of the body, which method consists in:

(A) Selecting certain frames of a motion picture film depicting the coordinated movement of an expert in a certain field;

(B) placing the frames of the selected set in a set of windows arranged longitudinally in an elongated strip of opaque material, and with the views of the expert in upright positions;

(C) selecting certain frames of a motion picture film depicting the coordinated movements of the student, which frames correspond in action to the first-mentioned set of frames;

(D) placing the second mentioned selected set of frames in a second set of windows arranged longitudinally in the elongated strip and at right angles, from longitudinal, with the windows of the first mentioned set, and with the views of the student in upright positions;

(E) inserting the strip in a viewer of that type which when the strip is viewed with only one eye of a pair of eyes of the student, only one of the frames of one of the sets can be seen, and, when the strip is viewed with only the other eye of the student, only one frame of the other set can be seen.

References Cited by the Examiner
UNITED STATES PATENTS 2,939,224  6/60  Rose et al. _____ 35—29

OTHER REFERENCES

Tru-Vue folder, dated July 1956, from the Tru-Vue Company, Beaverton, Oregon, 40–64A, 2 pp.

EUGENE R. CAPOZIO, *Primary Examiner.*

LEO SMILOW, JEROME SCHNALL, CHARLES A. WILLMUTH, *Examiners.*